May 5, 1953 W. R. CHAPIN 2,637,355
HACK SAW BLADE
Filed Nov. 22, 1950
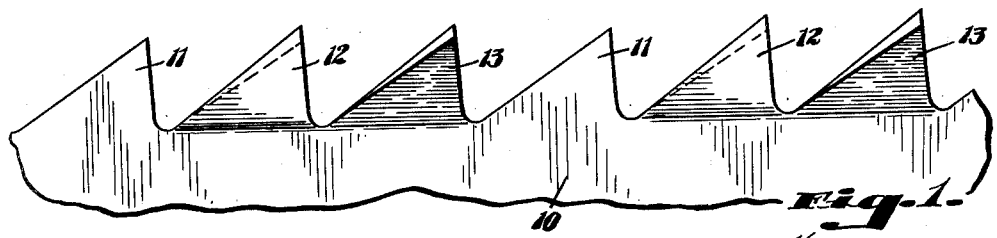
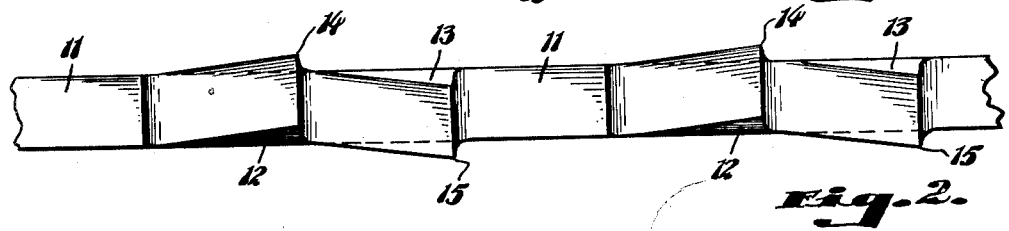
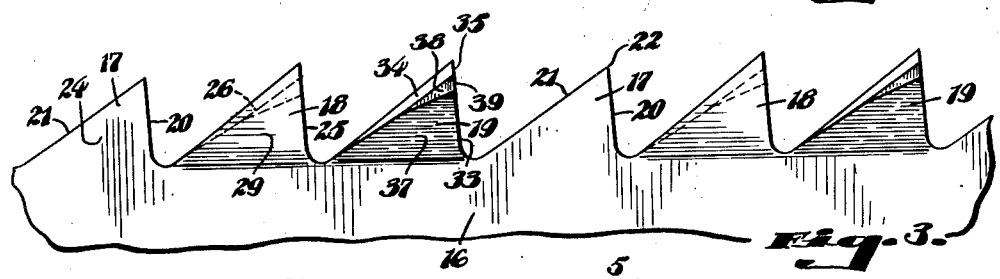
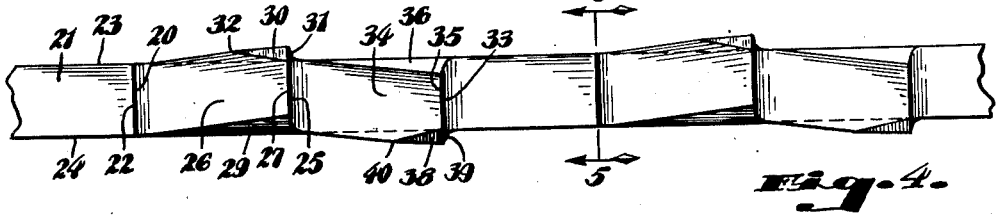
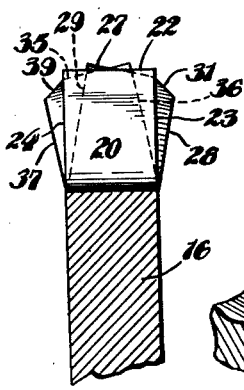
INVENTOR.
WILLIAM R. CHAPIN,
BY Harold B. Hood.
ATTORNEY.

Patented May 5, 1953

2,637,355

UNITED STATES PATENT OFFICE 2,637,355

HACK SAW BLADE

William R. Chapin, Indianapolis, Ind., assignor, by mesne assignments, to Borg-Warner Corporation, Chicago, Ill., a corporation of Illinois Application November 22, 1950, Serial No. 197,042

7 Claims. (Cl. 143—133)

The present invention relates to hack saw blades, and is primarily concerned with an improvement in hack saw blades of such character as to improve the smoothness and normality of the cut resulting from operation of such a blade.

The primary object of the invention is to provide a hack saw blade with set teeth of novel contour whereby that portion of each set tooth which defines a lateral wall of the kerf formed during operation of the blade comprises an edge of substantial lateral extent, instead of, as in conventional practice, a sharp point. A further object of the invention is to provide a tooth shape, in a hack saw, of such character that a substantial mass of metal lies behind and supports that cutting edge of each tooth which acts to cut away or form the kerf wall.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation, drawn to a greatly enlarged scale, of two groups of conventional hack saw teeth;

Fig. 2 is a plan view thereof;

Fig. 3 is a view similar to Fig. 1 but showing my improved blade with its novel form of teeth;

Fig. 4 is a plan view thereof;

Fig. 5 is a section taken substantially on the line 5, 5 of Fig. 1;

Fig. 6 is a forwardly-facing perspective view of a single set tooth-shaped in accordance with the present invention; and Fig. 7 is a rearwardly-facing perspective view of a group of hack saw teeth embodying the present invention in modified form.

According to conventional practice, a hack saw blade comprises a body 10 having teeth arranged along one edge thereof in groups of three, each group comprising a raker tooth 11 preceded by a cutting tooth 12 set laterally in one direction out of the plane of the body 10 and a cutting tooth 13 set laterally in the opposite direction out of said plane. Particularly by reference to Fig. 2, it will be clear that cutting in kerf walls is performed by the sharp corner points 14 and 15 of the set teeth 12 and 13, respectively. In practice, it is found that these points, which are almost completely unbacked, in the line of movement of the blade during operation, are frequently chipped and broken, thereby destroying the uniformity of the effective set of the teeth. Obviously, after such chipping, the blade cannot run true, and smooth kerf walls cannot be formed by the operation of the mutilated saw blade.

Very largely because of this chipping and breaking, the life of a conventional hack saw is measured in hours, eight cutting hours being about average life.

Additionally, it will be clear that uniformity of original setting of the teeth is commercially unattainable, either by known hammer setting processes or by known push setting processes. Slight variations in the resiliency of the teeth or in the force applied to the teeth by hammer blows, will result in slight variations in the degree of set attained in any saw blade.

I have discovered that, if the outer corner of the active edge of each set tooth is cut, ground, honed or otherwise shaped to produce an outwardly-declining cutting edge in place of the point 14 or 15, these defects in conventional hack saw blades are effectively overcome. Shaping of the tooth in this respect, to any degree, will improve the action and life of the blade; but I presently believe that the optimum tooth shaping is attained by defining at the outer corner of each set tooth, a surface meeting the leading face of the tooth in an angle inclined at 45° to the plane of the blade body, and at an angle of 22½° to the plane joining the tips of the raker teeth, that surface having one terminus in the plane of the adjacent surface of the blade body. As is clearly shown in Figs. 3, 4, 6 and 7, the inclined surface, which may be plane, as shown in Figs. 3 to 6, or convexly curved, as shown in Fig. 7, tapers rearwardly to disappear, in the line joining the trailing face and the adjacent side face of the tooth, intermediate the ends of that line. Throughout the present specification and claims, the word "bevel" and its derivatives will be used in the broadest sense to include an arrangement in which the devex surface is either plane or so curved.

My invention may be embodied in the form illustrated in Figs. 3 to 6 inclusive. There, I have shown a fragment of a hack saw blade body 16 having teeth arranged along one edge thereof. In Figs. 3 and 4, I have shown two complete tooth groups, each group comprising a raker tooth 17, a cutting tooth 18 set laterally to the left of the body plane, and a cutting tooth 19 correspondingly set laterally to the right of said plane. Each raker tooth 17 is formed to provide a leading face 20, substantially perpendicular to the line of travel of the blade but, in the illustrated embodiment of the invention, leaning slightly rearwardly from the perpendicular, and an inclined trailing face or back 21 which meets the face 20 in a transversely-extending edge 22 which is perpendicular to the lateral faces 23 and 24 of the tooth 17. The faces 23 and 24 lie, respectively, in the planes of the lateral surfaces of the blade body 16.

Each tooth 18 comprises a leading face 25 substantially parallel with the face 20 and an inclined trailing face or back 26 meeting the face 25 in an edge 27 perpendicular to the lateral faces 28 and 29 of the tooth 18. This tooth is set laterally with respect to the body 16 as is most clearly illustrated in Figs. 4 and 5. It corresponds to the tooth 12 of Figs. 1 and 2; but it differs therefrom in that an inclined surface 30 is formed thereon, thus eliminating the sharp point 14 of the tooth 12 and substituting therefor a cutting edge 31 of substantial lateral extent, said cutting edge being backed by a substantial mass of the metal of the tooth 18. The surface 30 tapers rearwardly to disappear, at the point 32, in the line of juncture between the surface 26 and the surface 28. As is most clearly illustrated in Fig. 5, the edge 31 inclines outwardly and toward the body 16, at an angle of 45° to the plane of the adjacent lateral surface of the body and of the surface 23 of the tooth 17, said edge having its inner terminus in that plane.

The third tooth 19 of each group comprises a leading face 33 parallel with the faces 20 and 25 and an inclined trailing face or back 34 meeting the face 33 in an edge 35; and this tooth is correspondingly set laterally in the opposite direction from the plane of the body 16. The edge 35 of the tooth 19 is perpendicular to the side surfaces 36 and 37 of that tooth; and the outwardly-projecting corner of the tooth 19 is similarly formed with an inclined surface 38 meeting the face 33 in a cutting edge 39 inclined outwardly and toward the body 16 at an angle of 45° to the plane of the adjacent surface of the body 16 and of the side face 24 of the tooth 17, the inner terminus of said edge 39 lying in said plane. The edge 39, like the edge 31, is backed by a substantial mass of tooth metal. The surface 38 tapers rearwardly and disappears at the point 40 in the line of juncture between the surface 34 and the surface 37.

Preferably, the blade of the present invention will be manufactured by producing a conventional, set hack saw blade, and then grinding and/or honing away the corners 14 and 15 of the set teeth to produce the surfaces 30 and 38 on each tooth 18 or 19. It will be readily apparent that, in so cutting the teeth to produce the surfaces 30 and 38, any departure from uniformity of set which may have arisen in the setting operation will be overcome, so that the edges 31 of all teeth 18, and the edges 39 of all teeth 19 will bear a uniform relation to the blade body 16. Additionally, in thus forming the edges 31 and 39, the effects of any decarburization which may exist in the cutting portions of the set teeth, will be removed.

It will be seen, particularly by reference to Fig. 5, that kerf-wall cutting will be performed, with a blade constructed in accordance with the present invention, by the edges 31 and 39 of substantial lateral extent, effectively backed by substantial metal masses, rather than by sharp unsupported corners or points 14 and 15 as is customary with conventional hack saw blades. As a consequence, chipping and breaking of the active portions of the set teeth is substantially completely eliminated, the life of the blade is immeasurably increased, the normality of the cut is maintained within much closer limits than has heretofore been possible with conventional blades, and the smoothness of the cutting surfaces is very greatly improved.

In the form of my invention illustrated in Fig. 7, the surface 30' of each tooth 18, and the corresponding surface of each tooth 19, will be radiused, as shown, so that the cutting edges 31' and 39' are curved lines instead of straight lines as shown in Figs. 3 to 6. Most, if not all, of the operating advantages of the form shown in Figs. 3 to 6 are retained in the form illustrated in Fig. 7, but the latter is, of course, somewhat more difficult and expensive to produce.

While I presently believe that the objects of my invention are most perfectly accomplished in a hack saw having the tooth group arrangement herein illustrated, many of the advantages of my invention nevertheless may be attained with different tooth groupings, even those not including raker teeth, so long as the set of the teeth are provided with the beveled cutting edges herein disclosed.

I claim as my invention:

1. A hack saw having raker teeth and oppositely set cutting teeth having leading faces and back surfaces, the back surfaces meeting at angles of generally 55° to said leading faces, the laterally-outer corners of the set teeth being bevelled to define triangular surfaces meeting said leading faces in cutting edges of substantial lateral extent, inclined at an angle of substantially 45° to the plane of the saw body, said triangular surfaces meeting said leading faces at angles of generally 78°.

2. A hack saw having raker teeth and oppositely set cutting teeth, the laterally-outer corners of the set teeth being triangularly bevelled to define cutting edges of substantial lateral extent, each of said edges extending from the outermost surface of its tooth substantially into the plane of the adjacent face of the saw body.

3. A hack saw comprising a blade formed along an edge thereof with a series of teeth, each tooth having a leading face substantially perpendicular to said edge, and a trailing face inclined to said edge, certain of said teeth being substantially coplanar with said blade, others of said teeth being alternately set to one side or the other of the plane of said blade and having their laterally-outer corners bevelled to provide triangular surfaces forming portions of trailing faces of the set teeth, the leading and trailing faces of each set tooth meeting in a line defining the cutting edge of the set tooth and the line inclining, from the outermost surface of said tooth substantially to the plane of the adjacent face of said blade, at one angle, and, at a larger angle, to the opposite face of said tooth.

4. A hack saw comprising a planar body formed along an edge thereof with a series of teeth, each of said teeth having a leading face rooted in said edge and projecting therefrom away from said body and a back inclining from the outer end of said face rearwardly and toward said body, certain of said teeth being set laterally in one direction and others of said teeth being set laterally in the opposite direction out of the plane of said body, the back of each set tooth having a surface, extending rearwardly from said leading face and inclined laterally outwardly and toward said body edge relative to the major portion of said back, such surface intersecting the outer lateral surface of said tooth and tapering from its intersection with said leading face to disappear short of the trailing edge of said back.

5. The hack saw of claim 4 in which each such surface is inclined at approximately 45° to the plane of said body.

6. The hack saw of claim 5 in which the inner edge of each such surface meets the leading face of its tooth substantially in the plane of the adjacent side of said body.

7. The hack saw of claim 4 in which the inner edge of each such surface meets the leading face of its tooth substantially in the plane of the adjacent side of said body.

WILLIAM R. CHAPIN.

References Cited in the file of this patent

UNITED STATES PATENTS

| Number | Name | Date |
|---|---|---|
| 938,158 | Lucas | Oct. 26, 1909 |

FOREIGN PATENTS

| Number | Country | Date |
|---|---|---|
| 902,190 | France | Nov. 27, 1944 |